March 11, 1941.   F. O. ANDEREGG   2,234,663
METHOD OF REINFORCING BUILDING UNITS
Filed Sept. 21, 1935
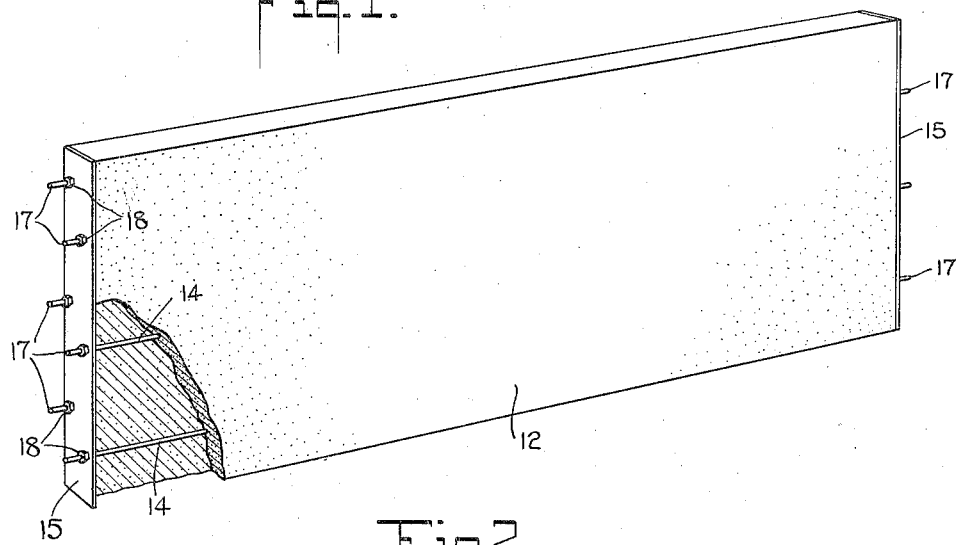
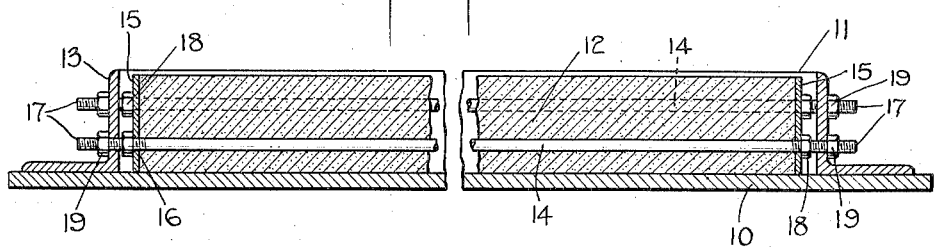
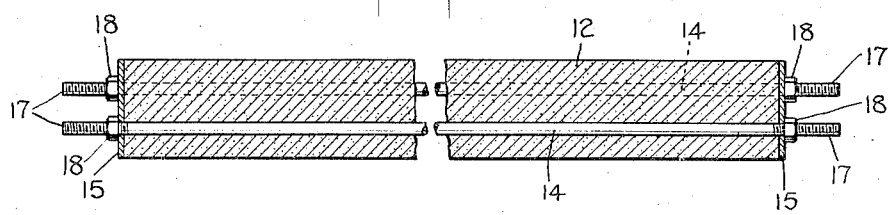
INVENTOR
Frederick O. Anderegg
BY
HIS ATTORNEY Patented Mar. 11, 1941

2,234,663

UNITED STATES PATENT OFFICE 2,234,663

METHOD OF REINFORCING BUILDING UNITS

Frederick O. Anderegg, Mount Union, Pa.

Application September 21, 1935, Serial No. 41,573

6 Claims. (Cl. 25—154)

My present invention relates to methods of reinforcing building units formed of cementitious composition material.

In the United States patent granted to Erik Hüttemann and Wolfgang Czernin, #1,932,971 dated October 31, 1933, entitled "Method of making light weight blocks," there is described the method of making light weight heat-insulating building blocks from a mixture of finely pulverized siliceous and calcareous materials, the result being highly porous blocks, each comprising a three-dimensional skeleton network of readily frangible calcium hydrosilicate. Such blocks, from the standpoint of insulating value are admirably adapted for use in building constructions, but, because of limitations in strength, have little structural value, this holding true especially for the comparatively large slab units.

The method of the present invention is designed primarily for the production, in connection with the method of the stated patent, of reinforced slab building units, light in weight and high in insulating value.

In producing the light weight composition material pursuant to the disclosure of the patent, the mixed constituent materials, at an advanced stage of preparation, i. e. at the stage immediately following molding to the form of the final product, are subjected to heat induration advantageously artificially supplied at an elevated temperature, and preferably by the application thereto of steam under pressure. Under the action of such heat induration, a highly porous, hard but readily frangible three-dimensional skeleton network of calcium hydrosilicate is formed. Upon formation, the skeleton network is filled with moisture resulting from the chemical reaction. It is principally at this stage that the method of the present invention is applied.

Essentially, as applied to the above material, the preferred method of this invention comprises incorporating suitable reinforcing means, such as steel rods, in the material forming the body member of the unit, prior to the stage of formation of the hard skeleton network, and maintaining such reinforcing means under tension during the formation of the skeleton network without thereby stressing the chemically active composition material. Thereafter, and during the cooling and drying stage of the calcium hydrosilicate skeleton network slab, the tension stress of the reinforcing means is transferred to compressive stress of the body member. After completion of the cooling and drying stage, the reinforcing means may be additional tension stressed, effecting a pre-stress of the unit to a degree structurally advantageous.

Because of the compressive force exerted on the body member during the cooling and drying stage, such cooling and drying may be accomplished rapidly in any suitable manner without structural injury to the cementitious composition material, and in fact, producing a highly porous three-dimensional skeleton network body member having strength and cohesion superior to that which it would otherwise have.

In its preferred practice, the method contemplates the use of substantially cylindrical rods of steel having a yield point of approximately 50,000 pounds per square inch. These rods are so placed within a suitable form-box as to extend across the same between two opposite end thereof, the rod-ends being threaded and extending through and beyond the stated ends of the form-box for the reception of tensioning nuts.

Inside the form-box are plates loosely strung on the rods adjacent the stated opposite ends of the form-box and configurated according to a cross-section of the desired slab. The plates are respectively separated from such form-box ends by nuts threaded on the rods.

The rods are initially tensioned by tightening the securing nuts against their contiguous form-box ends; whereupon, the plastic cementitious material is poured into the form-box between the stated plates. Upon setting of the cementitious material, the securing nuts and the form-box are removed, allowing the initial tension of the rods to manifest itself as compressive stress on the hardened cementitious material by reason of the bearing of the plates against the stated separating nuts. Such compressive stress is maintained during the final drying treatment of the cementitious material. Thereafter, the separating nuts may be tightened against the plates to tension the reinforcing ends and thus impart a predetermined pre-stress to the structural unit.

The reinforcing rods may be incorporated in the cementitious slab adjacent one or both faces, the positioning and the tensioning thereof being determined by the nature of the actual load the structural unit will carry in practice.

For example, in the case of floor slabs, which are designed to be combined joist and insulation, the rods on the under side are tightened to place the material under a compressive load of from approximately ⅕ to ⅓ of its compressive strength.

An object of my invention, therefore, is an improved method of reinforcing building units.

Another object is an improved method of preventing distortion in, and injury to, building units which are formed pursuant to the disclosure of U. S. Patent No. 1,932,971, during the cooling and drying thereof in the course of manufacture.

A further object is an improved reinforced building unit composed of relatively light material.

In the accompanying drawing,

Fig. 1 is a perspective view of an improved reinforced building unit, partly in section, and constructed in accordance with my improved method.

Fig. 2 is a sectional elevation through a molding form and through a building unit, showing the method of initially tensioning the reinforcing rods, and Fig. 3 is a sectional elevation of a building unit after removal thereof from the form.

Referring to the drawing, Fig. 2, 10 designates a floor or bed plate, of any desired superficial area, constituting the bottom of the mold or form-box in which the improved building units are constructed.

Secured to the top face of the floor or bed plate 10, in any suitable manner, is the mold or form-box 11, usually rectangular in shape. In the present instance, the length of the form is greater than the length of the building unit 12, but the width is equal thereto. One end of the form 11, as at 13, is removably secured to the floor or bed plate 10, for a purpose to be hereinafter described.

The building unit 12 representing one phase of the present invention, is shaped within the form 11. It may be of any desired thickness and linear dimensions. I have shown a building unit in the drawing of such thickness that reinforcing rods 14 are advantageously placed adjacent each major face thereof. At each end of the form 11, is placed a plate 15, having a length and breadth equal, respectively, to the width and thickness of the proposed building unit 12. Such plates 15 are provided with perforations 16 sufficiently large to permit the ends of reinforcing rods 14 to pass therethrough.

Corresponding perforations 16 in the plates 15 are in alignment with each other, to insure parallel placement of the reinforcing rods 14.

The respective ends of the reinforcing rods 14 are threaded, as indicated at 17, to receive nuts 18 and 19. The nuts 18 abut against the plates 15, and the nuts 19 abut against the respective outer faces of opposite end members of the form 11.

In carrying out my improved method, the reinforcing rods 14 are passed through the perforations 16 in the plates 15, and the nuts 18 are threaded into position against the outer faces of the plates 15. The reinforcing rods 14 are then passed through the perforations in the form 11, and through the removably secured end 13 of the form. The nuts 19 are then threaded onto the threaded ends 17 of the reinforcing rods 14 against the outer face of the form members.

As the nuts 19 are screwed onto the reinforcing rods 14, the said rods are placed under tension. The tension may be anything desired, within the limits of the strength of the materials.

The rods 14 being tensioned, the proper material is poured into the form 11, to form the slab 12, and the slab allowed to attain a preliminary set. The nuts 19 are then removed from the threaded ends of the reinforcing rods 14, thus permitting the tension in the rods 14 to be exerted on the plates 15 through the nuts 18. The complete setting and final drying of the slab 12 may be accelerated as fast as is necessary, or desirable, and it has been found that no deleterious effects are produced thereby.

The product resulting from the above described process is free from cracks, is homogeneous in structure, and the reinforcing permits it to be subjected to relatively rough treatment without apparent injury, either facial or structural.

Various modifications will readily suggest themselves to those skilled in this art and I therefore am not to be limited other than as pointed out in the appended claims. For example, the specified means for prestressing the reinforcing rods are merely illustrative. Various other devices for performing this operation, and placing the prestressed rods in relative position to the slab, both before and after casting, will readily suggest themselves to those skilled in the art.

After the drying, the nuts 18 are advantageously turned down to stretch the rods 14 again, placing the material 12 under compression up to 150 or 200 pounds per square inch. The amount of compression may be accurately determined and controlled by measuring the stretch in the rods 14.

The above step in the prestressing produces a surprising increase in stiffness, in resistance to bending loads, and in resistance to impact. For example, slabs have been made of the light weight material of the stated patent with the following dimensions: length 96 inches, width 30 inches, thickness 2 inches. The light weight material had a tensile strength of about 100 pounds per square inch, and a flexural strength of about 200 pounds per square inch.

Such slabs successfully withstood the impact of a 200-pound man jumping up and down on the middle of the slab, the slab being supported at its ends. Even when the impact was sufficient to exceed the pre-stress strength, thereby permitting the under side of the slab to open in tension, the slab resumed its normal state upon removing the load.

While the method of the invention is particularly advantageous as applied in connection with the method and material of the aforementioned patent, its application from a generic standpoint is by no means restricted thereto, being advantageous in its application to any cementitious material raising generally similar problems to those of the material of the patent.

I claim:

1. A method of producing a light weight reinforced structural building unit of a cementitious mixture of a type which, upon setting, will produce highly porous body, comprising casting the plastic cementitious mixture around reinforcing means maintained under tension, and allowing the cast cementitious mixture to take its initial set only while preventing the said tension from stressing the said cast cementitious mixture, thereafter transferring the tension stress of said reinforcing means to compressive stress of the set cementitious mixture; and maintaining said compressive stress while the mixture attains its final set.

2. A method as recited in claim 1 wherein the stated reinforcing means are additionally tensioned to a predetermined extent after the stated cementitious mixture has attained its final set whereby the resulting unit is structurally pre-stressed.

3. A method of producing a reinforced structural building unit of light-weight highly porous character from a mixture of finely divided silicious and calcareous material that has been processed to a stage requiring only the application of heat thereto to complete the formation of a hard, highly porous, three-dimensional skeleton network of calcium hydrosilicate, which comprises molding the so processed material to final unit form around tensioned reinforcing means while preventing the tension of said reinforcing means from stressing said material, subjecting the so molded unit to heat induration to complete the formation of the highly porous, three-dimensional skeleton network of calcium hydrosilicate, thereafter transferring the tension stress of said reinforcing means to compressive stress of the said three-dimensional skeleton network of calcium hydrosilicate, and cooling and drying said three-dimensional skeleton network of calcium hydrosilicate while maintaining the compressive stress thereof.

4. A method as recited in claim 3 wherein the stated reinforcing means are additionally tensioned to a predetermined extent after the stated cooling and drying treatment of the set cementitious material has been carried to conclusion whereby the resulting unit is structurally pre-stressed.

5. A method of producing a reinforced structural building unit of light-weight highly porous character from a cementitious mixture that has been processed to a stage requiring only the application of heat thereto to complete the formation of a hard, highly porous, three-dimensional skeleton network, which comprises molding the so processed mixture to final unit form around tensioned reinforcing means while preventing the tension of said reinforcing means from stressing said mixture, subjecting the so molded unit to heat induration to complete the formation of the highly porous, three-dimensional skeleton network, thereafter transferring the tension stress of said reinforcing means to compressive stress of the said three-dimensional skeleton network; and cooling and drying said three-dimensional skeleton network while maintaining the compressive stress thereof.

6. A method as recited in claim 5 wherein the stated reinforcing means are additionally tensioned to a predetermined extent after the stated drying treatment of the set cementitious mixture has been carried to conclusion whereby the resulting unit is structurally pre-stressed.

FREDERICK O. ANDEREGG.